US008225132B2

(12) United States Patent
Fujigaya

(10) Patent No.: US 8,225,132 B2
(45) Date of Patent: Jul. 17, 2012

(54) STORAGE SYSTEM DETECTING PHYSICAL STORAGE DEVICE SUFFERING FAILURE, AND METHOD OF PERFORMING PROCESSING FOR ADDITIONAL STORAGE DEVICE PROVISION

(75) Inventor: Hiroki Fujigaya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/299,372

(22) PCT Filed: Oct. 7, 2008

(86) PCT No.: PCT/JP2008/002833
§ 371 (c)(1),
(2), (4) Date: Nov. 3, 2008

(87) PCT Pub. No.: WO2010/041294
PCT Pub. Date: Apr. 15, 2010

(65) Prior Publication Data
US 2011/0179310 A1 Jul. 21, 2011

(51) Int. Cl.
*G06F 11/00* (2006.01)
(52) U.S. Cl. ............ 714/4.11; 714/6.13; 714/42; 714/43
(58) Field of Classification Search ................ 714/4.11, 714/6.13, 42, 43
See application file for complete search history.

(56) References Cited

U.S. PATENT DOCUMENTS

| 6,678,839 | B2 | 1/2004 | Mori | |
| 7,111,087 | B2 * | 9/2006 | Jiang et al. ...................... | 710/36 |
| 7,280,485 | B2 | 10/2007 | Suenaga | |
| 7,302,615 | B2 | 11/2007 | Sakai | |
| 7,412,628 | B2 | 8/2008 | Shikada | |
| 7,616,631 | B2 * | 11/2009 | Hetrick et al. ................ | 370/388 |
| 7,729,264 | B2 * | 6/2010 | Valdes et al. .................. | 370/241 |
| 2002/0191537 | A1 | 12/2002 | Suenaga | |
| 2003/0076789 | A1 * | 4/2003 | Kimura et al. ................ | 370/254 |
| 2003/0140099 | A1 | 7/2003 | Beer et al. | |

(Continued)

FOREIGN PATENT DOCUMENTS

JP 2001216206 8/2001

(Continued)

OTHER PUBLICATIONS

International Search Report issued on Jun. 4, 2009, in corresponding PCT/JP2008/002833 case.

(Continued)

*Primary Examiner* — Scott Baderman
*Assistant Examiner* — Loan L. T. Truong
(74) *Attorney, Agent, or Firm* — Brundidge & Stanger, P.C.

(57) ABSTRACT

In a storage system, a first loop and a second loop are connected to a controller, and at least one of the first loop and the second loop is connected to existing storage devices (which are physical storage devices other than additional storage devices, which are physical storage devices which are additionally provided). In processing for additional provision, after having disconnected all of the existing storage devices from the first loop, the controller connects an additional storage device to the first loop. And the controller acquires, via said first loop, an address acquired by this additional storage device, and makes a first suitability decision as to whether or not this address is appropriate. And, if the result of this first suitability decision is negative, then the controller blocks up this additional storage device whose address has been acquired.

11 Claims, 12 Drawing Sheets

U.S. PATENT DOCUMENTS

| | | | |
|---|---|---|---|
| 2004/0057444 A1* | 3/2004 | Brewer et al. | 370/403 |
| 2004/0172489 A1* | 9/2004 | Shikada | 710/15 |
| 2004/0215842 A1* | 10/2004 | Yardumian et al. | 710/9 |
| 2004/0252650 A1* | 12/2004 | Vageline et al. | 370/254 |
| 2005/0013609 A1 | 1/2005 | Fike et al. | |
| 2005/0022050 A1* | 1/2005 | Nagata et al. | 714/5 |
| 2006/0146698 A1* | 7/2006 | Ukrainetz et al. | 370/221 |
| 2006/0176889 A1* | 8/2006 | Berman | 370/405 |
| 2006/0182110 A1* | 8/2006 | Bomhoff et al. | 370/392 |
| 2007/0180331 A1* | 8/2007 | Chuah et al. | 714/43 |
| 2007/0240014 A1* | 10/2007 | Nagata et al. | 714/8 |

FOREIGN PATENT DOCUMENTS

| | | |
|---|---|---|
| JP | 2002374271 | 12/2002 |
| JP | 2004094774 | 3/2004 |
| JP | 2004199551 | 7/2004 |
| JP | 2006-139731 | 6/2006 |
| JP | 2007272702 | 10/2007 |

OTHER PUBLICATIONS

Japanese Office action mailed Mar. 27, 2012 in corresponding Japanese Application No. 2010-548697.

* cited by examiner

Fig.3

| LOOP # FOR CONNECTION / POSITION # OF EXISTING HDD | LOOP #0 (DKA 0) | LOOP #1 (DKA 1) |
|---|---|---|
| 00 | ON | OFF |
| 02 | ON | OFF |
| 03 | ON | OFF |

Fig.4

| LOOP # FOR CONNECTION / POSITION # OF ADDITIONAL HDD | LOOP #0 (DKA 0) | LOOP #1 (DKA 1) |
|---|---|---|
| 01 | ON | OFF |
| 04 | ON | OFF |
| 05 | OFF | OFF |

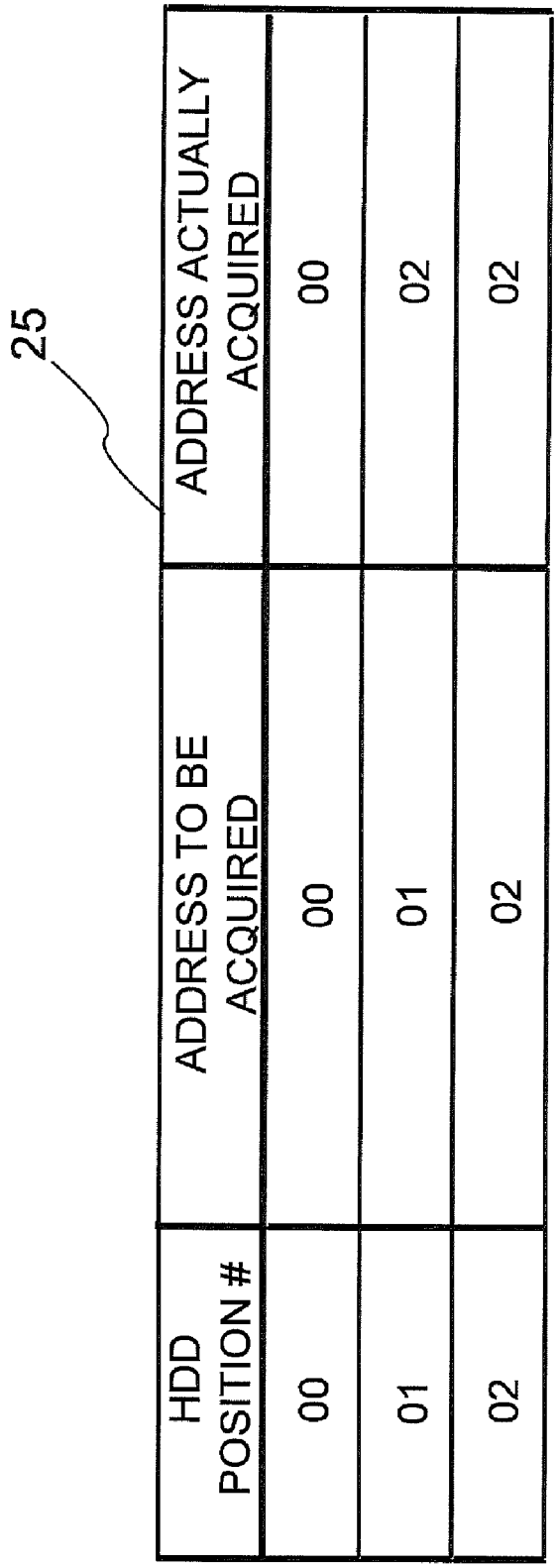

Fig.6A

Loop : 0

HDD Location : HDDR00-07

Progress : 25%

Status : Running

Fig.6B

Loop : 1

HDD Location : HDDR00-1F

Progress : 100%

Status : Normal END

Fig.6C

Loop : 0

HDD Location : HDDR00-1E

Progress : 40%

Status : Abnormal END

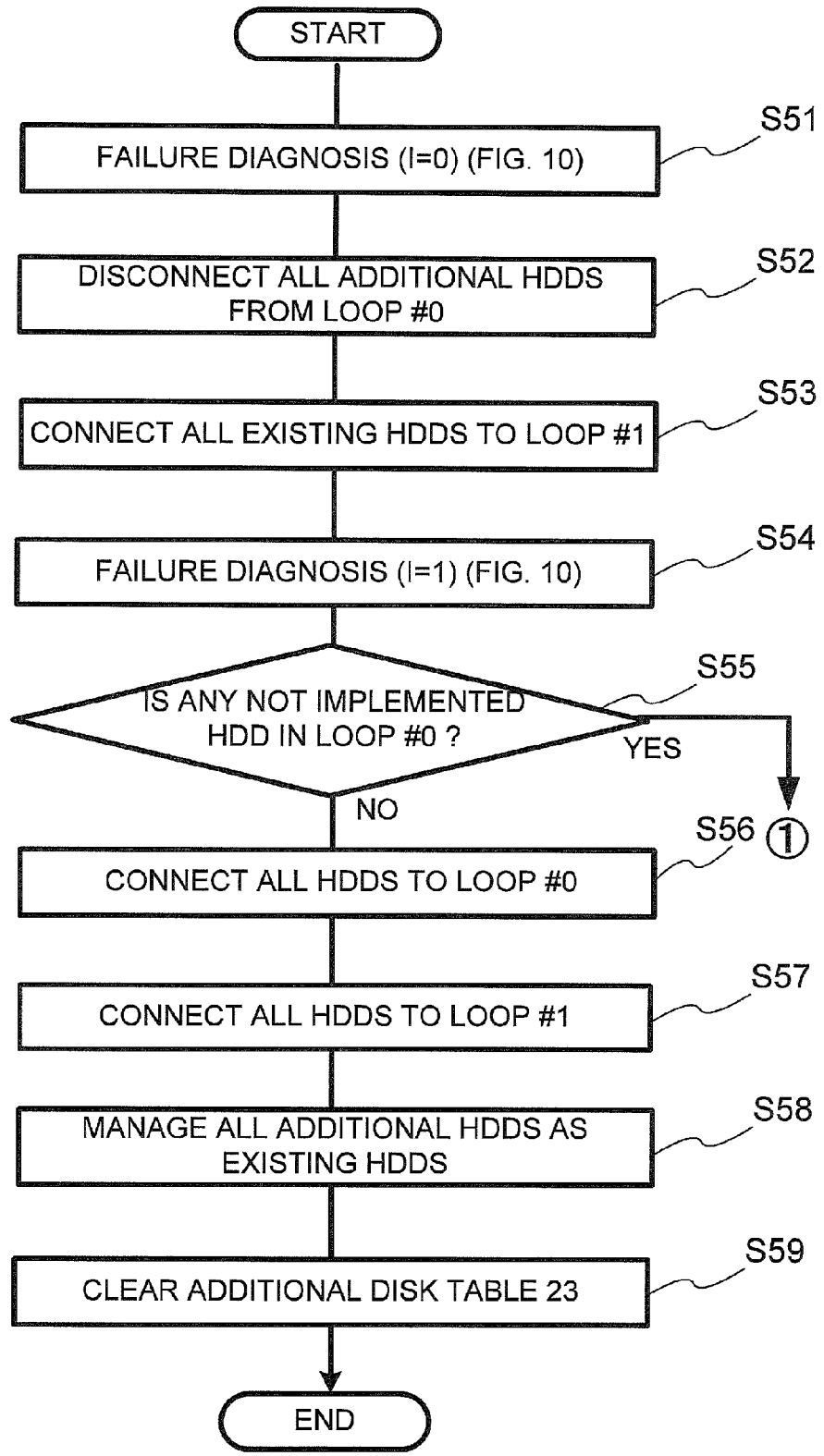

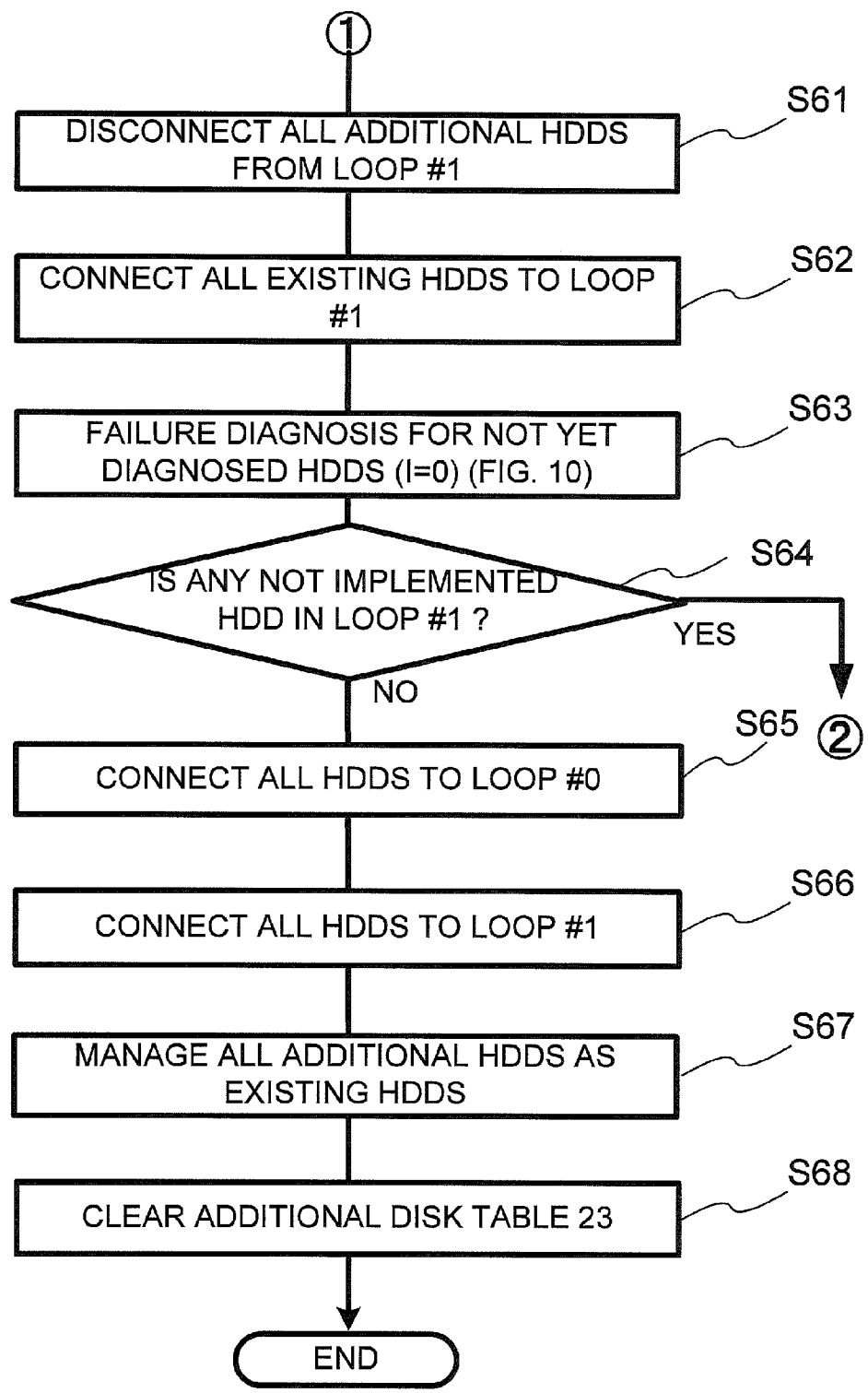

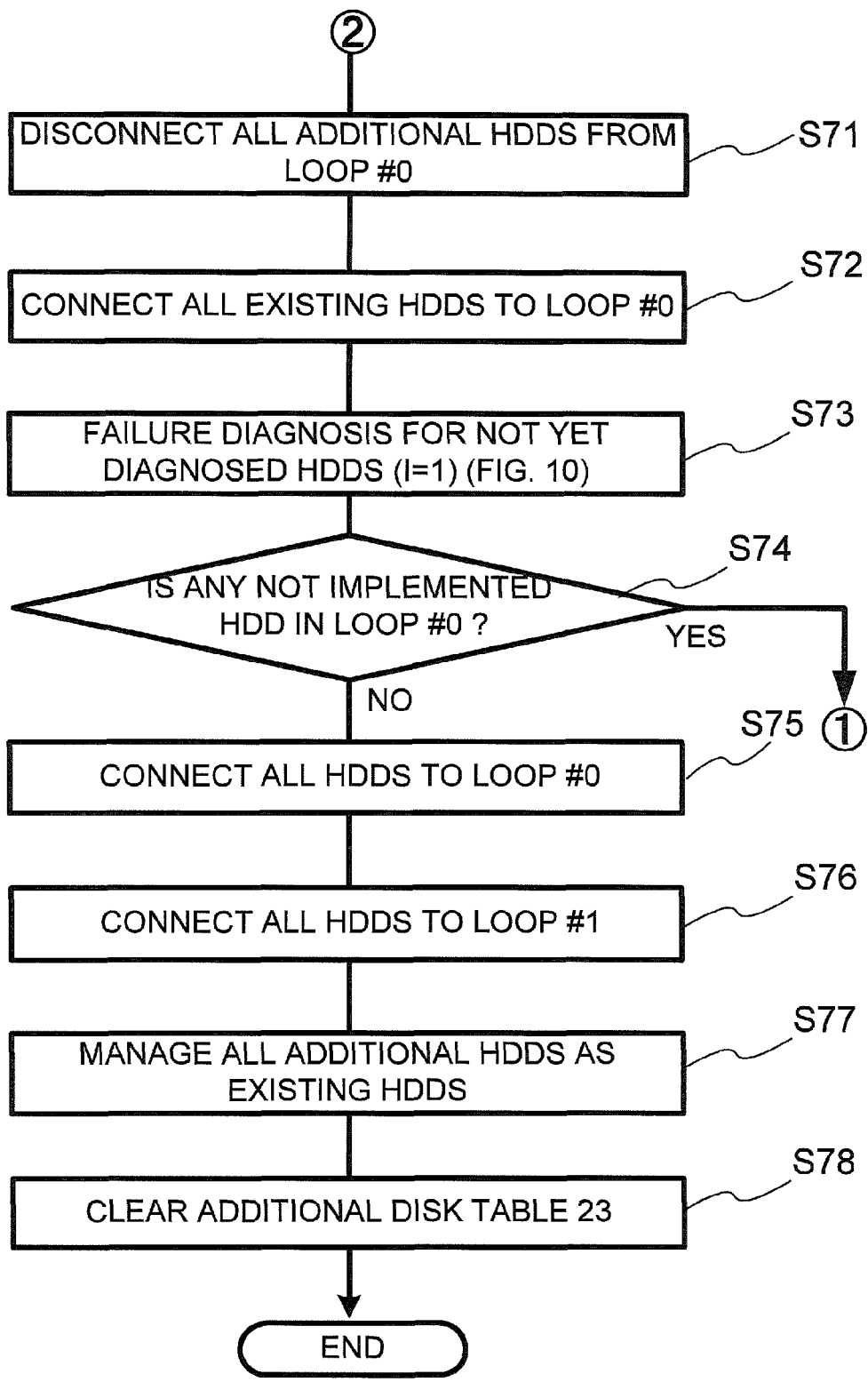

STORAGE SYSTEM DETECTING PHYSICAL STORAGE DEVICE SUFFERING FAILURE, AND METHOD OF PERFORMING PROCESSING FOR ADDITIONAL STORAGE DEVICE PROVISION

TECHNICAL FIELD

The present invention generally relates to a storage system which detects, among a plurality of physical storage devices which are provided to a storage system, a physical storage device in which a failure has occurred, and to a method of performing processing for additional storage device provision for such a storage system.

BACKGROUND ART

For example, Technique disclosed in Patent Citation 1 is known. According to this technique, a storage system includes a controller and a plurality of JBOD (Just a Bunch Of Disks) devices. Each of the JBOD devices includes a plurality of HDDs (Hard Disk Drives) which are connected by a loop, a SES (SCSI (Small Computer System Interface) Enclosure Service) function unit, and an ID setting unit.

If a JBOD device is additionally provided, the ID setting unit within this additionally provided JBOD device allocates an ID to each HDD within this JBOD device. And the SES function unit within this additionally provided JBOD device performs a comparison to see whether the ID which have been sent from the controller and the ID which has been allocated from the ID setting unit to the HDD agree with one another or not. If these IDs do not agree with one another, then this HDD to which ID have been allocated which do not agree are disconnected from the loop.

Patent Citation 1

Japanese Laid-Open Patent Publication 2006-139731

DISCLOSURE OF INVENTION

An HDD which has the function of acquiring its own addresses is known. Some storage systems use addresses acquired by their HDDs, in which aspect they differ from the disk array device disclosed in Patent Citation 1. With this type of storage system, for example, the HDDs receive signals corresponding to the positions of the slots in which these HDDs are inserted (or, to put it in another manner, to the connectors to which these HDDs are connected), and acquire their own addresses on the basis of these signals.

If a failure takes place in an HDD which is additionally provided to a storage system (hereinafter these will be termed "additional HDD"), then sometimes this additional HDD acquires an address which is the same as an address which has been acquired by some other properly operating HDD (for example, an existing HDD or some other additional HDD), and this is undesirable. In this case, the same address is established for a plurality of HDDs in the storage system. Therefore, for example, the other properly operating HDD which has acquired the same address is blocked and the additional provision is eliminated anomaly. In this case, a necessity arises to temporarily remove all of the additional HDDs and to redo the processing for additional provision from the beginning.

This type of problem is a problem which can also occur when additionally providing a physical storage device of a different type from a HDD.

Accordingly, an object of the present invention is, even if an additionally provided physical storage device acquires a mistaken address, to ensure that this does not exert any influence upon other physical storage devices which are operating properly.

A further object of the present invention is, even if an additionally provided physical storage device acquires a mistaken address, to ensure that this does not exert any influence upon other physical storage devices which are operating properly, and to complete the additional provision appropriately.

In a storage system, a first loop and a second loop are connected to a controller, and one or more existing storage devices (i.e. physical storage devices other than additional storage devices, which are physical storage devices that are additionally provided) are connected to at least one of the first loop and the second loop. In processing for additional provision the controller, after having disconnected all of the existing storage devices from the first loop, connects an additional storage device to the first loop. Then the controller acquires, via the first loop, the address which has been acquired by this additional storage device, and makes a first suitability decision by deciding whether or not that address is suitable. If the result of this first suitability decision is negative, then the controller blocks off this additional storage device which has acquired this address.

BRIEF DESCRIPTION OF DRAWINGS

FIG. 3 shows an example of the structure of an existing disk table 21.

FIG. 4 shows an example of the structure of an additional disk table 23.

FIG. 5 shows an example of the structure of an address table 25.

FIG. 6A shows an example of a diagnostics screen which is displayed during failure diagnosis.

FIG. 6B shows an example of a diagnostics screen which is displayed if the failure diagnosis has terminated normally.

FIG. 6C shows an example of a diagnostics screen which is displayed if the failure diagnosis has terminated abnormally.

FIG. 7 shows a first portion of a processing flow for loop joining processing.

FIG. 8 shows a second portion of this flow of processing for loop joining processing.

FIG. 9 shows the remaining portion of this flow of processing for loop joining processing.

EXPLANATION OF REFERENCE

20 . . . storage system

BEST MODE FOR CARRYING OUT THE INVENTION

In the following, an embodiment of the present invention will be explained with reference to the drawings.

Figure 1:
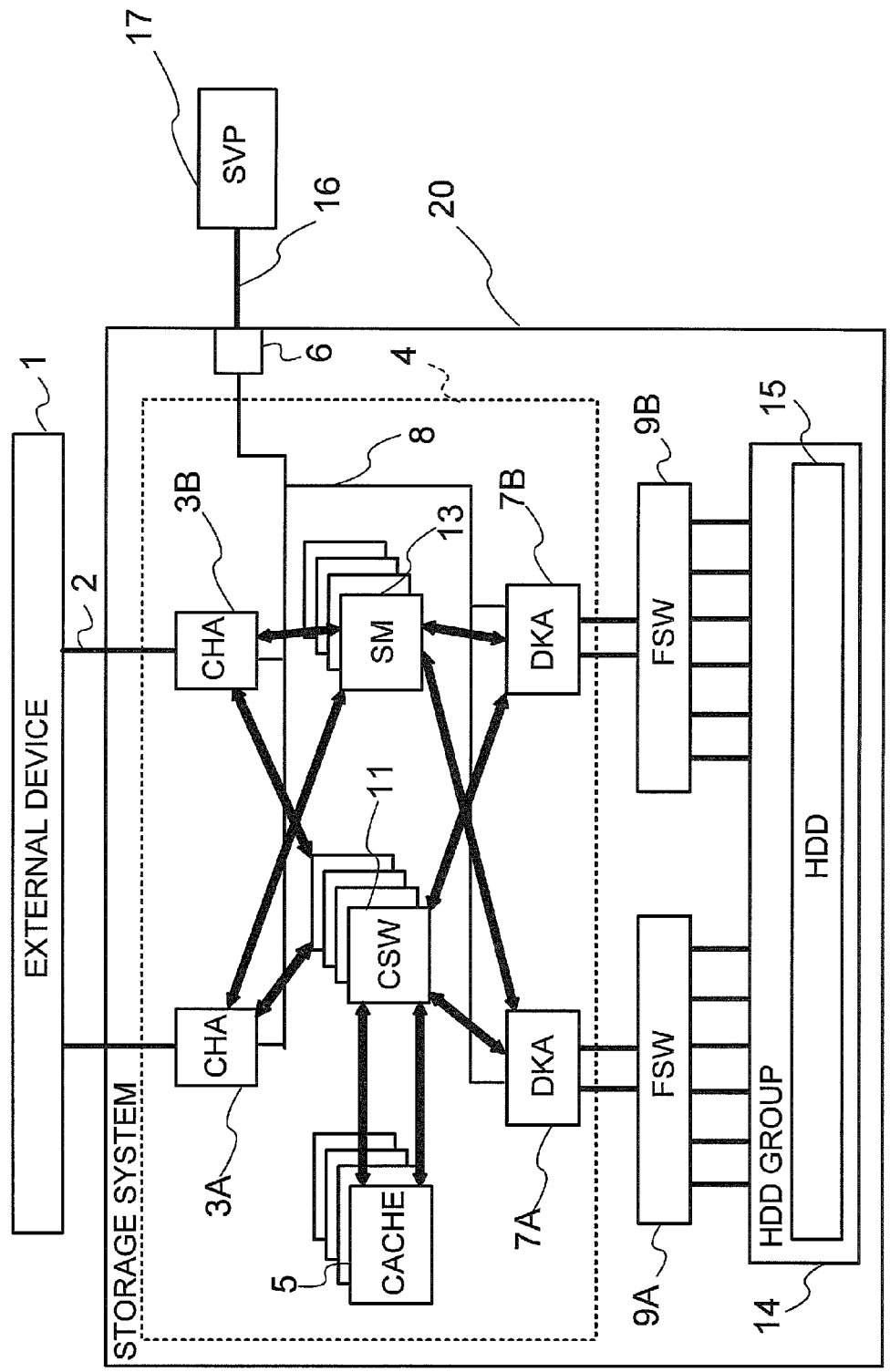
FIG. 1 shows a structural example of a computer system according to an embodiment of the present invention.

FIG. 1 shows an example of the structure of a computer system according to an embodiment of the present invention.

An external device 1 (for example a host computer such as a server or the like) is connected to this storage system 20 via a communication network (for example a SAN (Storage Area Network)). For example, a NIC 6 (Network Interface Card) way be provided to the storage system 20, and a SVP (Service Processor) 17 may be connected to this NIC 6 via a LAN (Local Area Network) cable 16.

The external device 1 may be, for example, a computer which is provided with various information processing resources such as a CPU (Central Processing Unit) and memory and so on, and may be, for example, a personal computer, a work station, a main frame, or the like. Although, in this embodiment, the external device (i.e. the server) 1 is described as being only one in number, there could also be several thereof.

The storage system 20 may be, for example, a RAID (Redundant Array of Independent (or Inexpensive) Disks) system which includes a large number of hard disk drives 15 (hereinafter termed HDDs), arranged in the form of an array. The storage system 20 comprises a controller 4, fiber path switches (FSWs) 9A and 9B, and a HDD group 14. The controller 4 may, for example, comprise channel adapters (CHAs) 3A and 3B, cache memories (CACHEs) 5, disk adapters (DKAs) 7A and 7B, cache switches (CSWs) 11, and shared memories (SMs) 13. It should be understood that while, for the convenience of explanation and illustration, two or four of these CHAs, CACHEs, DKAs, FSWs, CSWs, and SMs are shown and described, it would also be acceptable for there to be more or fewer of each or all of these.

The CHAs 3A and 3B are interface devices which perform data communication with an external device 1. These CHAs 3 may, for example, be built as microcomputer systems (for example circuit boards), each of which includes a CPU, memory, a plurality of communication ports, and so on. The external device 1 is connected to certain of these communication ports.

The CACHEs 5 are volatile (or non-volatile) cache memories, and temporarily store data which is transferred between the CHAs 3 and the DKAs 7 (i.e. data which is received from the external device 1 and is written upon a HDD 15, or data which is read out from a HDD 15 and is supplied to the external device 1).

The DKAs 7A and 7B are interface devices which perform data communication with the HDDs 15. These DKAs 7 may also, for example, be built as microcomputer systems (for example circuit boards), each of which includes a CPU, memory, a plurality of communication ports, and so on. The DKAs 7A and 7B perform reading and writing of data to and from the HDDs 15. This reading and writing of data may, for example, be performed via loops which satisfy the FC-AL (Fibre Channel Arbitrated Loop) fiber channel standard.

The FSW 9A (9B) is a device having a loop which is connected to the DKA 7A (7B), and, in response to a signal from the DKA 7A (7B), connects a HDD 15 to the loop, or cuts a HDD off from the loop. The FSW 9A (9B) relays communication between the DKA 7A (7B) and this HDD 15 which is connected.

Each CSW 11 mutually connects together a CHA 3, a CACHE 5, and a DKA 7. These CSWs may, for example, consist of high speed buses such as ultra high speed cross bus switches or the like which perform data transfer by high speed switching operation. Transfer of data or commands between the devices denoted by the reference symbols 3, 5, and 7 is performed via the CSWs 11. Moreover, the CSWs 11 are also switches for controlling the CACHEs 5.

The SMs 13 may be, for example, volatile or non-volatile memories, and store information which is referred to by the CHAs 3A and 3B and the DKAs 7A and 7B for control of this storage system 20. This stored information may be, for example, a command table, an existing disk table, an additional disk table, and a setting table. These tables will be explained in detail hereinafter.

The HDD group 14 may, for example, be built from one or a plurality of RAID groups (RAID groups are sometimes called parity groups or array groups). Each of these RAID groups consists of two or more HDDs 15. One or a plurality of logical storage devices (hereinafter termed LDEVs) are constituted based upon the storage space provided by the two or more HDDs 15 which make up each RAID group. LUNs of the LUs allocated to the LDEVs, and port numbers of communication ports of the CHAs 3A and 3B, are designated in the I/O commands (write commands or read commands) from the external device 1. And I/O takes place for the LDEVs corresponding to these port numbers and LUNs. By I/O taking place for the LDEVs, is meant that I/O is performed via the DKA 7A or 7B to or from the HDDs 15 upon which the LDEVs are based. It should be understood that, instead of the HDDs 15, it would also be acceptable to employ physical storage devices of some other type, for example flexible disks, magnetic tapes, semiconductor memories (for example flash memories), optical disks, or the like.

The SVP 17 is a computer which performs maintenance management of the storage system 20 (for example, setting of its structure and log sampling and so on), and which includes resources for processing the information described above. On the basis of a command from the user who actuates this SVP 17, the SVP 17 performs transfer of various types of information between the CHAs 3A and 3B and the DKAs 7A and 7B via an internal network 8. When the SVP 17 receives information, it converts this information into so called visible information, and outputs it upon a monitor or the like (not shown in the figures). It should be understood that, in this embodiment, the SVP 17 is connected to the storage system 20 via a LAN cable 20, but it would also be acceptable for it to be connected to the storage system 20 via a communication network such as, for example, the internet or the like, not shown in the figures.

Figure 2:
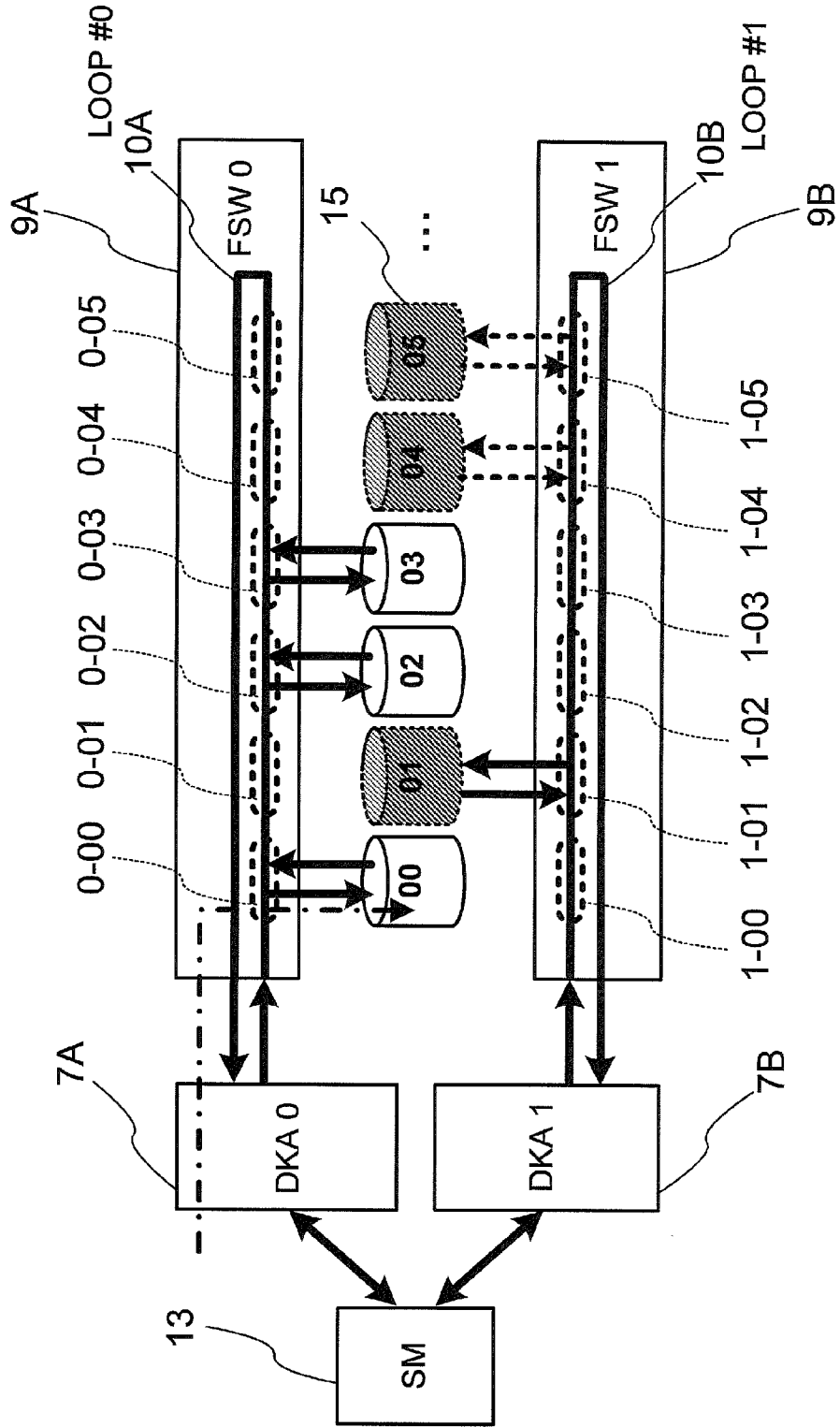
FIG. 2 shows the structure of certain data transfer paths between DKAs and HDDs.

FIG. 2 is a figure showing the structure of data transfer paths between the DKAs and the HDDs.

In this embodiment, each of the HDDs 15 may either be an additional HDD or an existing HDD. In FIG. 2, hatching is applied to the supplementary HDDs. By an "additional HDD" is meant an HDD which has been attached by additional provision processing during this episode (i.e. which is an added or exchanged HDD). And by an "existing HDD" is meant an HDD other than an additional HDD, in other words a HDD which was installed from before any additional provision processing was performed during this episode. In the explanation of FIG. 2, the number of HDDs 15 is six. In this embodiment, from the upstream side to the downstream side in terms of the flow of data to the HDDs 15, these six HDDs 15 are arranged in the order: HDD 00, HDD 01, HDD 02, HDD 03, HDD 04, and HDD 05.

The data transfer paths to the HDDs 15 are duplexed. In other words, I/O for the HDDs 15 can be performed via either a loop 10A or a loop 10B. In the following the loop 10A will be termed the "loop #0", and the loop 10B will be termed the "loop #1". Moreover, the DKA 7A and the FSW 9A which relate to the loop #0 will be termed the "DKA #0" and the "FSW #0" respectively, while the DKA 7B and the FSW 9B which relate to the loop #1 will be termed the "DKA #1" and the "FSW #1" respectively.

The FSW #0 has PBCs (Point Bypass Circuits) 0-00 through 0-05. Similarly, the FSW #0 has PBCs 1-00 through 1-05. The PBCs 0-00 through 0-05 (or 1-00 through 1-05) are circuits which control whether the HDDs 00 through 05 are connected to the loop #0 (or the loop #1) or whether alternatively the HDDs 00 through 05 are bypassed (in other words, whether the HDDs 00 through 05 are disconnected from the loop #0 (or the loop #1)). Each of the PBCs 0-00 through 0-55 (or 1-00 through 1-05) changes over between connection of the HDDs 00 through 05 to the loop #0 (or the loop #1) and cutting them off therefrom, in response to a signal from the DKA #0 (or the DKA #1).

The DKA #0 is connected to the FSW #0 via a data transfer path upon a circuit substrate (for example a back plane) which is provided internally to the storage system 20, or via a communication cable. The loop #0 is constituted by the DKA #0 being connected to the FSW #0. For example, when the DKA performs I/O to or from the existing HDD 03 via the loop #0, it is arranged for I/O commands to pass through the existing HDD 00, to bypass the additional HDD 01, to pass through the existing HDD 02, and thus to arrive at the existing HDD 03.

In a similar manner, the DKA #1 as well is connected to the FSW #1 via a data transfer path upon a circuit substrate (for example a back plane) which is provided internally to the storage system 20, or via a communication cable. The loop #1 is constituted by the DKA #1 being connected to the FSW #1.

In this embodiment, at the start, all of the existing HDDs are connected both to the loop #0 and to the loop #1, and all of the additional HDDs are disconnected both from the loop #0 and from the loop #1.

If at least one additional HDD is present, then additional provision processing is performed. In this additional provision processing, as shown in FIG. 2, one of the loop #0 and the loop #1 becomes a loop for connection to the existing HDDs, while the other becomes a loop for connection to the additional HDDs. When failure diagnosis for the other loop has ended, they are mutually changed over. In other words, the first one of the loop #s becomes the loop for connection to the additional HDDs, while the other becomes the loop for connection to the existing HDDs.

According to the example shown in FIG. 2, the loop #0 is a loop for connection of the existing HDDS, while the loop #1 is a loop for connection of the additional HDDs. To express this in concrete terms, the existing HDDs 00, 02, and 03 are shown in the figures as being connected to the loop #0 by solid arrows being drawn between these existing HDDs 00, 02, and 03 and the loop #0, and are shown as being disconnected from the loop #1 by no arrows being drawn between these existing HDDs 00, 02, and 03 and the loop #1. Furthermore, the additional HDD 01 is shown in the figures as being connected to the loop #1 by a solid arrow being drawn between this additional HDD 01 and the loop #1, and is shown as being disconnected from the loop #0 by no arrow being drawn between this additional HDD 01 and the loop #0.

According to the above structure, with this storage system 20, if an I/O command is received from the external device 1, then this I/O command is processed even during processing for additional disk provision (heareinafter "additional processing"). In the example shown in FIG. 2, for example, if I/O is to be performed to an LDEV which is based upon the HDD 00, then during additional processing this I/O is performed for the HDD 00 from the DKA #0 via the loop #0, as shown by the single dotted broken line in FIG. 2.

The connection of additional HDDs is performed one at a time. In this embodiment, connection to the HDDs is established in sequence from the additional HDD at the upstream side of the flow of data from the DKA #0 (or from the DKA #1) (in other words, from the additional HDD towards the side of the controller). In FIG. 2, the fact that dotted arrows are present between the additional HDDs 04 and 05 and the loop #1 means that they are not as yet connected to the loop #1, but that, if the address diagnostics result for the additional HDD 01 which is more upstream proves to be OK, then these additional HDDs 04 and 05 will be connected to the loop #1 in the order 04 and then 05.

It should be understood that the disconnection of the existing HDDs 00, 02, and 03 from the loop #1 is performed before any one of the additional HDDs (for example the additional HDD 01) is connected to the loop #1. The reason for this is that, if the additional HDD 01 were to be connected to the loop #1 with the HDDs 00, 02, and 03 still being connected to that loop #1, and if an address acquired by the additional HDD 01 were to duplicate an address upon any one of the existing HDDs 00, 02, and 03, then the existing HDD 00, 02, or 03 which has the duplicate address would become blocked, which would be undesirable. To put this in another manner, this is done in order to ensure that, even if an address acquired by the additional HDD 01 which is connected to the loop #1 duplicates an address upon any one of the existing HDDs 00, 02, and 03, still the existing HDD 01, 02, or 03 which has that duplicated address does not become blocked.

Although, in this embodiment, the processing which is subsequently explained with reference to FIGS. 7 through 11 is described as being performed by the DKA #0 (and by the DKA #1), actually this processing is performed by computer programs stored in the memory of the DKA #0 (or of the DKA #1) being executed by, for example, a CPU within the DKA #0 (or within the DKA #1). As such computer programs, for example, as shown in FIG. 12, there may be cited a loop joining control program 211 which executes the processing shown in FIGS. 7 through 9, and a failure diagnosis program 212 which executes the processing shown in FIGS. 10 and 11 (in FIG. 12, "computer program" is abbreviated as "PG").

Figure 13:
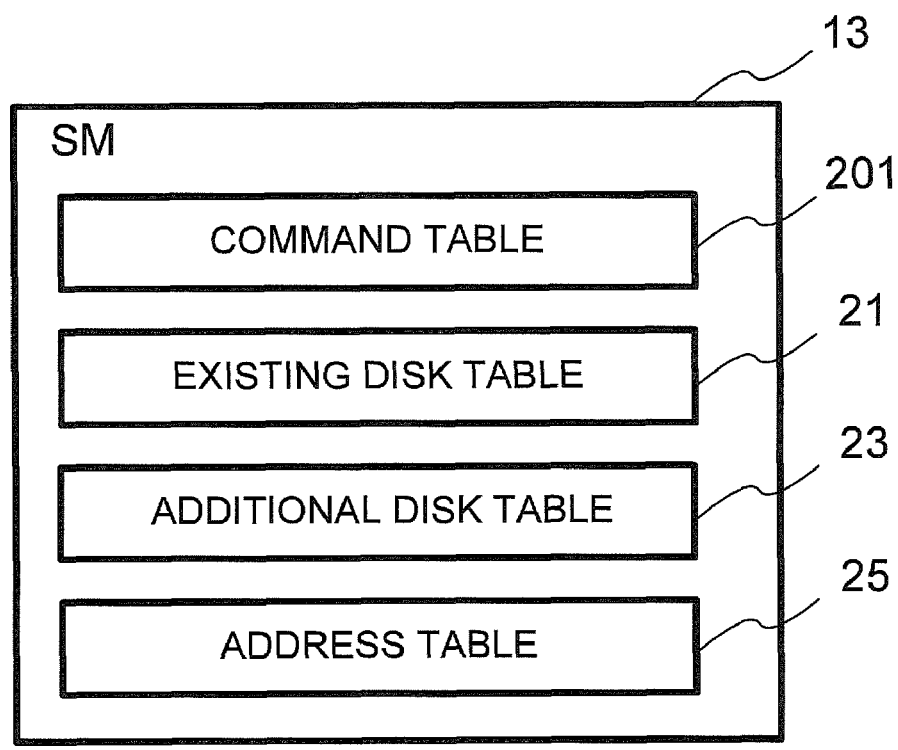
FIG. 13 shows an example of information which is managed by shared memory.

The DKA #0 and the DKA #1 refer to management information which is stored in the SM 13, as appropriate. Examples of such management information include, for example, the command table 201, the existing disk table 21, the additional disk table 23, and the setting table 25, as shown in FIG. 13.

In the command table 201, there is recorded information (for example HDD position numbers, hereinafter termed "HDD position #s") specifying the number of the additional HDDs and the positions of provision of these additional HDDs. These items of information are information items which are inputted from the SVP 17. It should be understood that, for the positions of the HDDS, there may for example be employed the numbers of the slots in which the HDDs 15 are inserted, the numbers of the connectors to which the HDDs 15, which have been inserted into the slots, are connected, or the like.

The existing disk table 21, the additional disk table 23, and the address table 25 will now be explained in detail with reference to FIGS. 3 through 5.

FIG. 3 shows the structure of the existing disk table 21.

Whether or not each of the existing HDDs is connected to the loop #0 and to the loop #1 is recorded in this existing disk table 21. In concrete terms, for example, for each of the existing HDDs (HDD 00, HDD 02, and HDD 03), its HDD position #, information specifying its state of connection to the loop #0, and information specifying its state of connection to the loop #1, may be recorded in the existing disk table 21. The information for an existing HDD specifying its state of connection to the loop #0 is information which specifies whether or not that existing HDD is connected to the loop #0, and, similarly, its information specifying its state of connection to the loop #1 is information which specifies whether or not it is connected to the loop #1. Such information specifying a connection state shows "ON" if the HDD in question is connected and "OFF" if it is disconnected. Accordingly, in the example shown in FIG. 3, it will be understood that the existing HDDs 00, 02, and 03 are connected to the loop #0 but are disconnected from the loop #1.

If the information specifying the state of connection shows "ON", then this means that the existing HDD which corresponds to this information is connected to the loop # which corresponds to this information. On the other hand, if the information specifying the state of connection shows "OFF", then this means that the existing HDD which corresponds to this information is disconnected from the loop # which corresponds to this information.

FIG. 4 shows the structure of the additional disk table 23.

For each of the additional HDDs, the address diagnostics results for the loop #0 and for the loop #1 are recorded in this additional disk table 23. In concrete terms, for each of the additional HDDs (HDD 01, HDD 04, and HDD 05), for example, the HDD position #, the diagnostics result information for the loop #0, and the diagnostics result information for the loop #1 is recorded in the additional disk table 23. The diagnostics result information for the loop #0 is information which specifies the results of the address diagnostics for the loop #0. Similarly, the diagnostics result information for the loop #1 is information which specifies the results of the address diagnostics for the loop #1. If the diagnostics result information shows "ON", this means that, for the additional HDD which corresponds to this information, the result of the address diagnostics for the loop # which corresponds to this information is OK. On the other hand, if the diagnostics result information shows "OFF", this means that, for the additional HDD which corresponds to this information, the result of the address diagnostics for the loop # which corresponds to this information is NG. If the additional HDD has been mounted, then the diagnostics result information is "OFF" for both the loop #0 and the loop #1.

FIG. 5 shows the structure of the address table 25.

For each HDD position, the HDD position #, the address which is to be acquired, and the actually acquired address are recorded in the address table 25. In this embodiment, for each position in the storage system where a HDD can be fitted, the address which is to be acquired by an HDD which is attached in this attachment position is determined in advance.

The DKA #0 (or the DKA #1) transmits to the SVP 17 information related to failure diagnosis which will be described hereinafter, and the SVP may, for example, display a diagnostics screen such as those shown in FIGS. 6A through 6C.

FIG. 6A shows an example of a diagnostics screen which is displayed during the failure diagnosis.

On this diagnostics screen, as information related to the failure diagnosis, there are displayed the following four items of information:

(6A-1) information ("Loop") which shows for which loop # this failure diagnosis is being performed;

(6A-2) the position # ("HDD Location") of the additional HDD for which the current address diagnostics is being performed;

(6A-3) information ("Progress") which shows the progress of the failure diagnosis; and (6A-4) information ("Status") which shows the state of the failure diagnosis.

By referring to the diagnostics screen shown in FIG. 6A, the user can know that the failure diagnosis is being performed for the loop #0, and that the additional HDD for which the failure diagnosis is being performed at this time is the HDD which is attached in the HDD position # "HDD R00-07". Moreover, he can also know that 25% of this failure diagnosis for the loop #0 has been completed, and that the diagnostics are still running at this time ("Running").

FIG. 6B is an example of a diagnostics screen which is displayed if the failure diagnosis has terminated normally.

By referring to this screen, the user can know that the failure diagnosis which was performed for the loop #1 has ended normally. ("Normal END").

FIG. 6C is an example of a diagnostics screen which is displayed if the failure diagnosis has terminated abnormally.

By referring to this screen, the user can know that the failure diagnosis performed for the loop #0 has ended at the time point that 40% of that diagnostics had been completed, and ended abnormally. ("Abnormal END"). Moreover, he can understand that the additional HDD which was the cause of this anomalous termination was the HDD attached at the HDD position "HDD R00-1 E".

In the following, the flow of the processing performed in this embodiment will be explained.

FIGS. 7 through 9 show the processing flow of the loop joining processing which is performed when an HDD is additionally provided. This flow of processing is implemented by the DKA #0 and the DKA #1 cooperating in a timely manner. As previously described, this flow of processing is performed by the loop joining control program 211 being executed by the DKA #0 (or by the DKA #1).

Initially, as previously described, all of the existing HDDs (00, 02, and 03) are connected both to the loop #0 and to the loop #1, and all of the additional HDDs (01, 04, and 05) are disconnected both from the loop #0 and from the loop #1.

The DKA #0 executes failure diagnosis for the loop #0 (a step S51). The processing flow of this failure diagnosis will be explained subsequently with reference to FIG. 10. It should be understood that the "i" shown in the figures is a variable, and "i=0" means that the failure diagnosis is being executed for the loop #0. Moreover, this failure diagnosis may be performed by, for example, the loop joining control program 211 calling the failure diagnosis program 212.

When this failure diagnosis terminates normally, the state in which the HDDs 15 are connected to and are disconnected from the HDDs 15 is returned to its initial state.

In other words, the DKA #0 disconnects all of the additional HDDs (01, 04, and 05) from the loop #0 by transmitting disconnect signals to the PBCs 0-01, 0-04, and 0-05 in the FSW #0 (a step S52).

Furthermore, the DKA #1 connects all of the existing HDDs (00, 02, and 03) to the loop #1 by transmitting connect signals to the PBCs 1-00, 1-02, and 1-03 in the FSW #1 (a step S53).

Next, the DKA #1 performs failure diagnosis for the loop #1 (a step S54). The processing flow for this failure diagnosis is as will be explained subsequently with reference to FIG. 10. It should be understood that the "i=1" in the figures means that failure diagnosis is performed for the loop #1.

If this failure diagnosis ends normally, then the DKA #1 refers to the additional disk table 23, and decides whether or not there is any "OFF" listed for the loop #0 (a step S55). In other words it is decided, for the loop #0, whether or not there is any additional HDD for which failure diagnosis is not yet implemented (in FIG. 7, this HDD is called "not implemented HDD"). It should be understood that at this stage, the case in which an additional HDD is newly added, and the case of an additional HDD being exchanged, are both considered in the steps S52 through S54 as cases which have an "OFF" for the loop #0.

If the result of the decision in the step S55 is negative (NO in the step S55), then the DKA #0 connects all of the HDDs 15 (in other words the HDDs 01 through 06) to the loop #0 (a step S56). Furthermore, the DKA #1 connects all of the HDDs 15 to the loop #1 (a step S57). And the DKA #0 (the DKA #1) manages all of the additional HDDs as existing HDDS. In concrete terms, the DKA #0 (or the DKA #1) registers the HDD position of the additional HDD in the existing disk table 21 (a step S58). And it deletes the information relating to all of the additional HDDs from the additional disk table 23.

If the result of the decision in the step S55 is affirmative (YES in the step S55) then, as shown in FIG. 8, the DKA #1 returns the connected/disconnected states of the HDDs 15 and the loop #0 and the loop #1 to their initial states. In other words, the DKA #1 disconnects all of the additional HDDs from the loop #1 (a step S61), and then connects all of the existing HDDs to the loop #1 (a step S62).

Next, the DKA #0 executes failure diagnosis for the loop #0 (a step S63). This failure diagnosis is only performed for those additional HDDs for which failure diagnosis for the loop #0 has not yet been implemented (in other words, for those additional HDDs whose entries under the loop #0 in the additional disk table 23 are "OFF").

If this failure diagnosis ends normally, then the DKA #0 refers to the additional disk table 23, and decides whether or not all of the entries for the loop #1 are "OFF" (a step S64). In other words, it decides whether or not there still exists any additional HDD for which failure diagnosis for the loop #1 has not yet been implemented. It should be understood that, at this stage, the case in which an additional HDD is newly added, and the case of an additional HDD being exchanged, are both considered in the steps S61 through S63 as cases for which the entry for the loop #1 is "OFF".

If the result of the decision in the step S64 is negative (NO in the step S64), then processing similar to the previously described steps S59 through S59 is performed (by the steps S65 through S68).

If the result of the decision in the step S64 is affirmative (YES in the step S64), then, as shown in FIG. 9, the DKA #0 returns the connection/disconnection states of the HDDs 15 and the loops #0 and #1 to their initial states. In other words, the DKA #0 disconnects all of the additional HDDs from the loop #0 (a step S71), and then connects all of the existing HDDs to the loop #0 (a step S72).

Next, the DKA #1 executes failure diagnosis for the loop #1 (a step S73). This failure diagnosis is only performed for those additional HDDs for which failure diagnosis for the loop #1 has not yet been implemented (in other words, for those additional HDDs whose entries under the loop #1 in the additional disk table 23 are "OFF").

If this failure diagnosis ends normally, then the DKA #0 refers to the additional disk table 23, and decides whether or not any entry for the loop #0 remains as "OFF" (a step S74). In other words, it decides whether or not there is any additional HDD for which failure diagnosis for the loop #0 has not yet been implemented. It should be understood that, at this stage, the case in which an additional HDD is newly added, and the case of an additional HDD being exchanged, are both considered in the steps S71 through S73 as cases which have an "OFF" for the loop #0.

If the result of the decision in the step S74 is affirmative (YES in the step S74), then the step S61 of FIG. 8 and the subsequent steps are performed.

On the other hand, if result of the decision in the step S74 is negative (NO in the step S74), then processing similar to the steps S56 through S59 described previously is performed (in steps S75 through S78).

Figure 14:
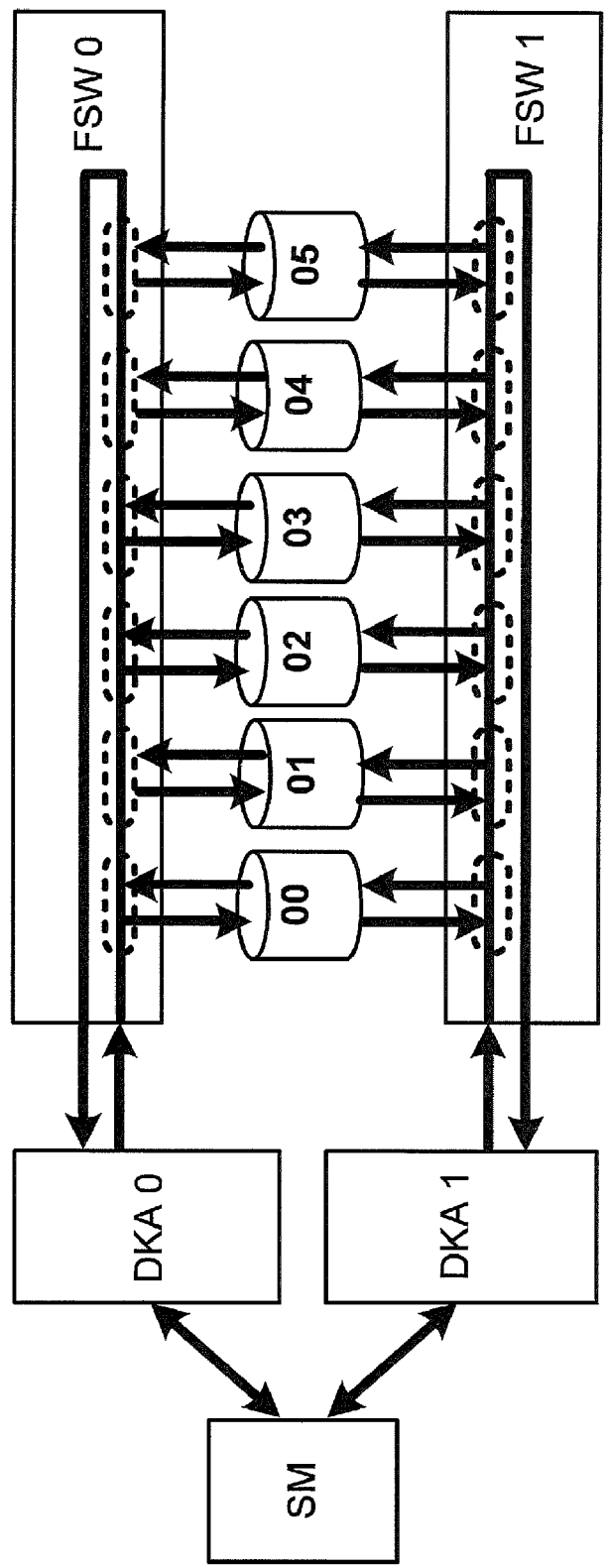
FIG. 14 shows the state of connection/disconnection for the HDDs and loops #0 and #1 when processing for additional provision has ended.

When the loop joining processing shown in FIGS. 7 through 9 ends, the connection/disconnection states of the HDDs 15 and the loop #s are changed, for example, from the states shown in FIG. 2 to the states shown in FIG. 14. In other words, all of the HDDs 00 through 05 are connected both to the loop #0 and also to the loop #1, and moreover, by converting all of the additional HDDs (01, 04, and 05) into existing HDDs, it is arranged for the six HDDs 00 through 06 all to become existing HDDs.

Figure 10:
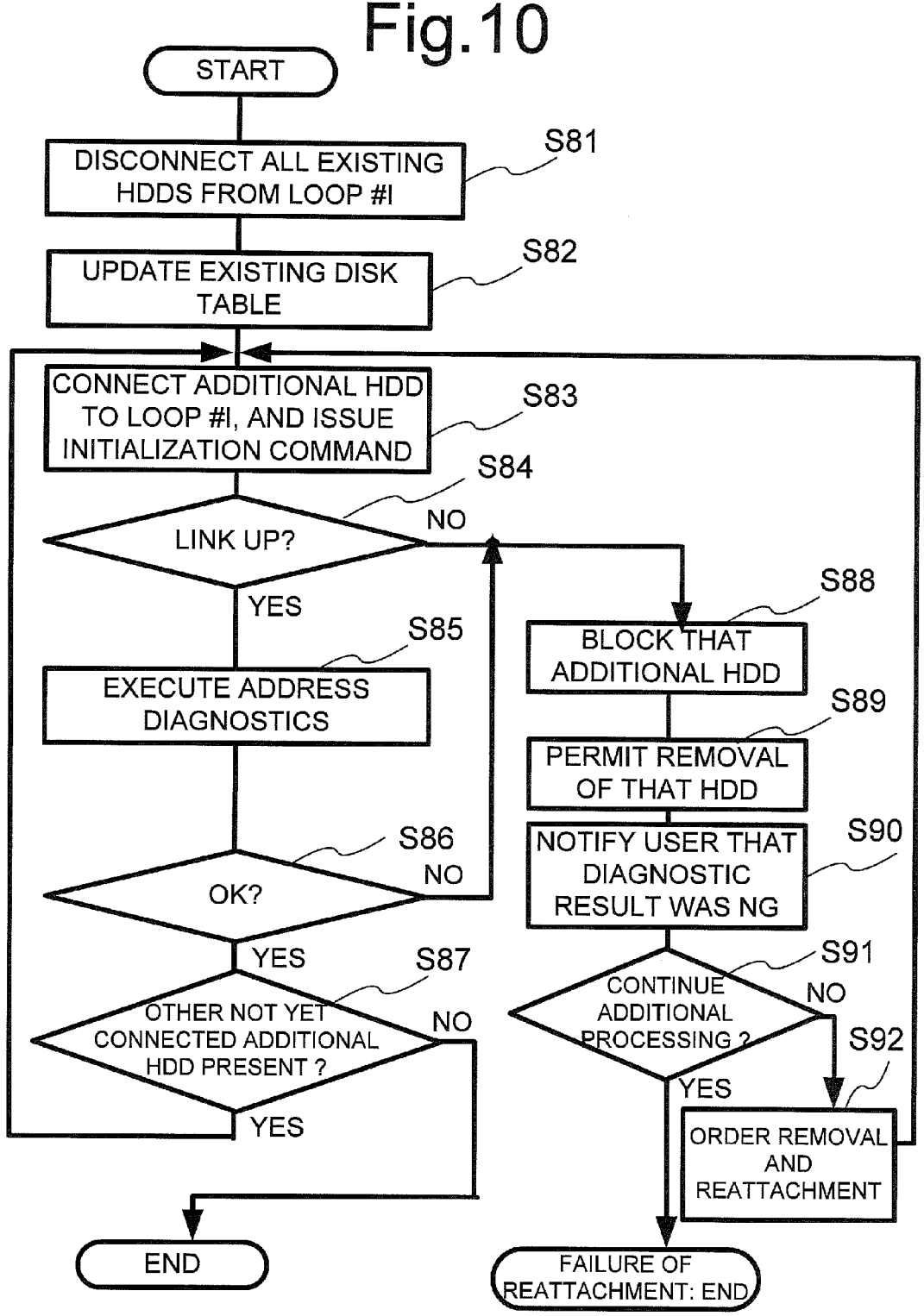
FIG. 10 shows a flow of processing for the failure diagnosis.

FIG. 10 shows the flow of the processing for failure diagnosis.

The DKA #i disconnects all of the existing HDDs from the loop #i (a step S81). It should be understood that "i" is the variable described previously, and the value which is substituted for i is 0 or 1.

Next, in the existing disk table 21, the DKA #i sets all of the items which specify the states of connection corresponding to the loop #s to which the existing HDDs are connected to "ON" (a step S82).

Next, the DKA #i connects to the loop #i the one which is most to the upstream side, among the additional HDDs which are not yet connected to the loop #i, and issues an initialization command to that additional HDD (a step S83). This "initialization command" is a command for linking up the HDD to the loop #i. "Linking up" means linking together the HDD connected to the loop #i and the controller.

When, in response to this initialization command, the additional HDD has been linked up (YES in a step S84), then the DKA #1 performs address diagnostics for this additional HDD (a step S85). The processing flow of this address diagnostics will be explained subsequently with reference to FIG. 11.

Next, by referring to the additional disk table 23, the DKA #i decides whether or not the result of the address diagnostics in the step S85 was OK (a step S86). Here, if the diagnostics result information in the additional disk table 23 for the loop #i in relation to the additional HDD which is the subject of the address diagnostics is "OFF", then the diagnostics result is NG; while, if the diagnostics result information is "ON", then the diagnostics result is OK.

If the result of the decision in the step S86 is affirmative (YES in the step S86), then the DKA #i refers to the additional disk table 23, and decides whether or not there is any other additional HDD which is not yet connected to the loop #i (a step S87). Here, if there are some the diagnostics result information "OFF" for the loop #i in the additional disk table 23, then there is indeed present some other additional HDD which is not yet connected to the loop #i; while, if there are not any the diagnostics result information "OFF" for the loop i the additional disk table 23, then no other additional HDD which is not yet connected to the loop #i is present.

If the result of the decision in the step S87 is affirmative (YES in the step S87), then the DKA #i transfers the flow of control to the step S83 for that other additional HDD which is not yet connected to the loop #i.

If the result of the decision in the step S87 is negative (NO in the step S87), then the DKA #i terminates this failure diagnosis. In this case, information which indicates that the failure diagnosis has terminated normally is sent from the DKA #i to the SVP 17, which then may display, for example, the diagnostics screen shown in FIG. 6B.

Moreover, if the result of the decision in the step S86 is negative (NO in the step S86), then the DKA #i blocks that additional HDD for which the result of address diagnostics was NG (a step S88).

Next, the DKA #i permits removal of that additional HDD which has been blocked (for example, it may illuminate a LED which specifies this fact) (a step S89), and outputs to the SVP 17 a message which informs the user that the result of diagnosis of that additional HDD was NG (a step S90). At this time, for example, via the SVP 17, the DKA #i may ask the user whether or not to continue the additional processing.

And the user inputs whether the additional processing should be continued or not to the SVP 17. Thus, the DKA #i receives from the SVP 17 information as to whether or not the additional processing should be continued. Based upon this information, the DKA #i decides whether or not to continue the additional processing (a step S91).

If the result of the decision in the step S91 is negative (NO in the step S91) (in other words, if the additional processing is to be stopped), then the DKA #i considers that the failure diagnosis has terminated abnormally, and accordingly notifies the SVP 17 that the failure diagnosis has terminated abnormally. In this case, for example, the diagnostics screen shown in FIG. 6C may be displayed.

If the result of the decision in the step S91 is affirmative (YES in the step S91) (in other words, if the additional processing is to be continued), then the DKA #i orders the removal and the re-attachment of the additional HDD for which the result of the address diagnostics was NG (a step S92). Upon receipt of this command, the user temporarily removes this additional HDD, and then re-attaches this additional HDD (or an exchange additional HDD) in the same fitting position. Thereafter, the processing of the step S83 and subsequently is performed with this re-attached additional HDD as the subject.

These steps S88 through S92 are also performed if the additional HDD which has been connected is not linked up (NO in the step S84).

Figure 11:
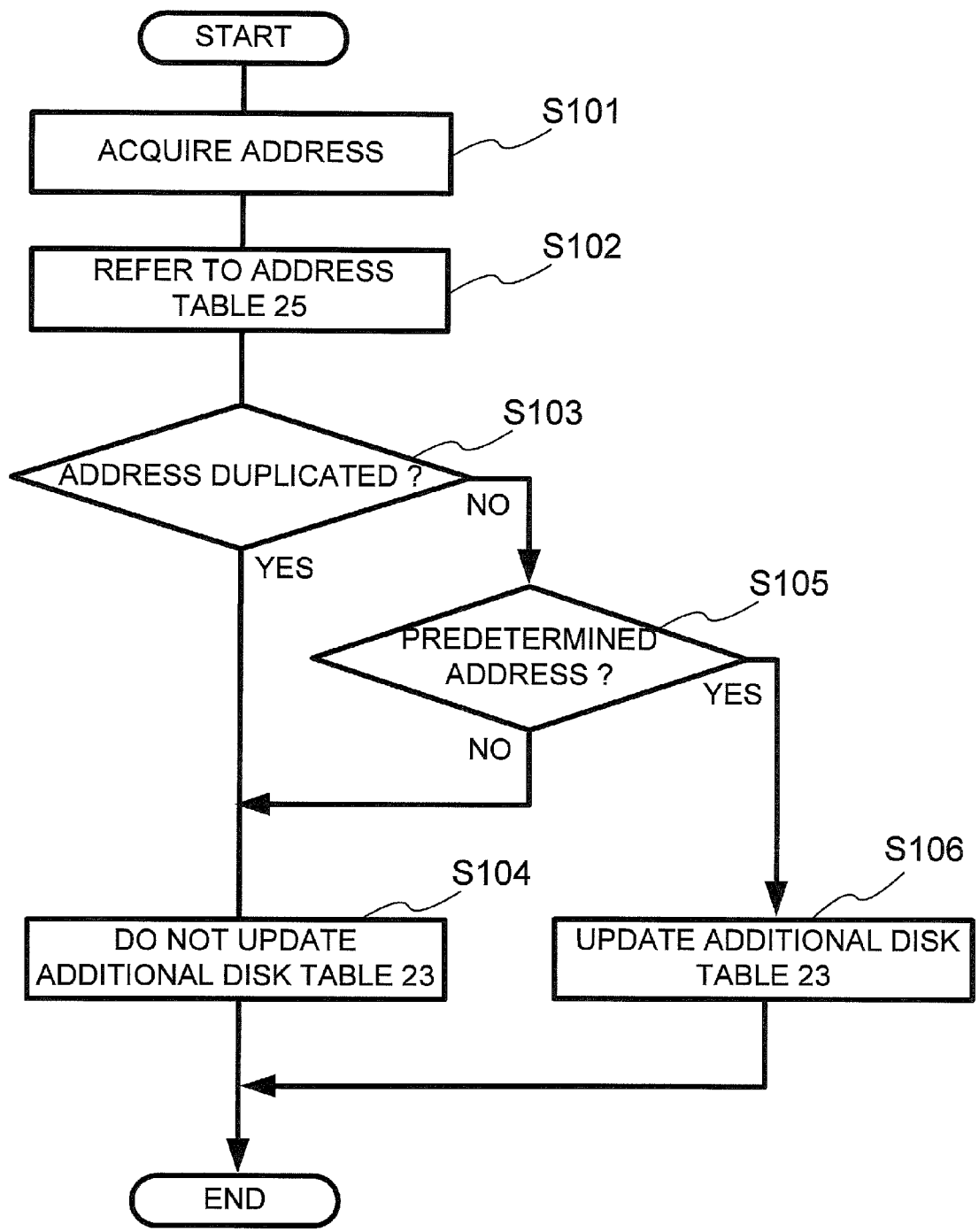
FIG. 11 shows a flow of processing for address diagnostics.
Figure 12:
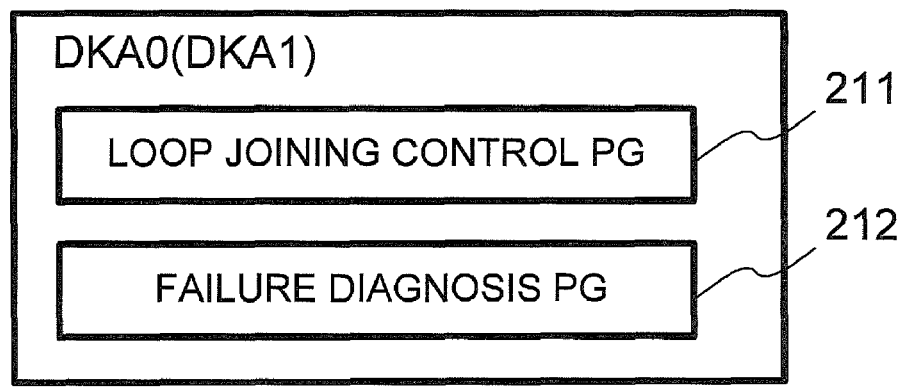
FIG. 12 shows an example of a computer program which is executed by a DKA.

FIG. 11 shows the flow of processing for address diagnostics.

The additional HDD which has been linked up acquires its own address. And, via the loop #i, the DKA #i acquires this address from this additional HDD which has been linked up (a step S101).

The DKA #i refers to the address table 25 (a step S102), and makes a decision as to whether or not an address exists in the address table 25 which duplicates the address which was acquired in the step S101 (a step S103).

If the result of the decision in the step S103 is affirmative (YES in the step S103) (in other words, if such a duplicate address exists), then the DKA #i does not update the diagnostics result information in the additional disk table 23 corresponding to the loop #i for the additional HDD whose address was acquired in the step S101 (a step S104). Due to this, this diagnostics result information remains at "OFF" just as it is. To put it in another manner, NG comes to be registered in the additional disk table 23 as the result of address diagnostics for this additional HDD.

If the result of the decision in the step S103 is negative (NO in the step S103) (in other words, if no such duplicate address exists), then the DKA #i decides whether or not this additional HDD which has been linked up has acquired its predetermined address (a step S105).

If the result of the decision in the step S105 is negative (in other words, if the address which was acquired in the step S101 is not the predetermined address which corresponds to the fitting position of this additional HDD (which is registered in advance in the address table 25 as being the address to be acquired)) (NO in the step S105), then the step S104 is performed.

On the other hand, if the result of the decision in the step S105 is affirmative (YES in the step S105), then the DKA #i updates the diagnostics result information in the additional disk table 23 corresponding to the loop #i for the additional HDD whose address was acquired in the step S101 from "OFF" to "ON" (a step S106). To put this in another manner, the value "OK" comes to be registered in the additional disk table 23 as the result of address diagnostics for this additional HDD.

In the above, according to this embodiment, one of the loops #0 and #1 which are duplexed is taken as being the loop for the additional HDDs, and the other of these loops is taken as being the loop for the existing HDDs. Due to this, it is possible to perform the additional processing without exerting any influence upon the existing HDDs, even if an improper address is acquired via the loop for the additional HDDs (such as an address which duplicates an address which is already registered in the address table 25, or an address which is not the predetermined address corresponding to the position of fitting). Moreover, according to this embodiment, if an additional HDD has been detected in which a failure has occurred, a selection as to whether or not to continue the additional processing is received from the user, and, if the user decides upon continuation, then removal of this additional HDD and replacement thereof is performed by the user, and then the processing is restarted from the step S83 of FIG. 10. To put it in another manner, in this embodiment, even if an additional HDD is detected in which a failure has occurred, it is possible to manage without restarting the provision for additional provision from the first HDD again.

Furthermore, in this embodiment, there is no requirement to stop I/O from the external device 1 due to the additional processing, since the existing HDDs are certainly connected either to the loop #0 or to the loop #1.

Although the present invention has been explained above in terms of a preferred embodiment thereof, the present invention is not to be considered as being limited to this embodiment; it goes without saying that the present invention may be modified in various different ways, provided that no departure takes place from the scope of its essential concept, as defined by the Claims.

The invention claimed is:

1. A storage system, comprising:
a controller;
a plurality of physical storage devices;
a first switching device including a first loop which is connected to said controller; and a second switching device including a second loop which is connected to said controller;

and wherein:

in response to a signal supplied from said controller, said first switching device connects a physical storage device to said first loop, or disconnects that physical storage device from said first loop;

in response to a signal supplied from said controller, said second switching device connects a physical storage device to said second loop, or disconnects that physical storage device from said second loop;

each physical storage device is endowed with a function of acquiring an address, and is either an additional storage device, which is a physical storage device which is additionally provided, or an existing storage device, which is some physical storage device other than said additional storage devices;

said controller executes first diagnostics processing consisting of:

(1-1) disconnecting all of the existing storage devices from said first loop;

(1-2) connecting an additional storage device to said first loop;

(1-3) acquiring, via said first loop from the additional storage device which was connected to said first loop by said (1-2), an address which is acquired by the additional storage device; and (1-4) performing a first suitability decision, which is a decision as to the suitability or unsuitability of said address which was acquired in (1-3) above;

if the result of said first suitability decision is negative, blocks the additional storage device which acquired the address acquired in (1-3) above; and said controller:

if the result of said first suitability decision in said first diagnostics processing is affirmative, and if there is an additional storage device which is not yet connected for which said (1-2) has not been performed in said first diagnostics processing, performs said (1-2) for this not yet connected physical storage device;

if the result of said first decision is affirmative for all of said additional storage devices, executes second diagnostic processing consisting of:

(2-1) disconnecting all of the existing storage devices from said second loop;

(2-2) connecting an additional storage device to said second loop;

(2-3) acquiring, via said second loop from the additional storage device which was connected to said second loop by said (2-2), an address which is acquired by the additional storage device; and (2-4) performing a second suitability decision, which is a decision as to the suitability or unsuitability of said address which was acquired in (2-3);

if the result of said second suitability decision is negative, blocks the additional storage device which acquired an address in (2-3), while on the other hand, if the result of said second suitability decision is affirmative, if there is an additional storage device which is not yet connected for which said (2-2) has not been performed in said second diagnostics processing, performs said (2-2) for this not yet connected physical storage device;

if there is some additional storage device for which either said first diagnostics processing or said second diagnostics processing has not yet been performed, performs, for that additional storage device, that one of said first diagnostics processing and said second diagnostics processing which has not yet been performed; and if there is no additional storage device for which said first diagnostics processing and said second diagnostics processing have not yet been performed, and if moreover there is no additional storage device for which the result of either said first suitability decision or said second suitability decision is negative, connects all said physical storage devices both to said first loop and to said second loop, and moreover terminates said processing for additional provision by managing all of said additional storage devices as existing storage devices.

2. A storage system according to claim 1, wherein:

in said (1-1), all of the additional storage devices are disconnected from said second loop, and all of the existing storage devices are connected to said second loop;

in said (2-1), all of the additional storage devices are disconnected from said first loop, and all of the existing storage devices are connected to said first loop;

and, if an I/O command has been received from an external device during said processing for additional provision, in response to this I/O command, said controller performs I/O to the existing storage device upon which the logical storage device designated by this I/O command is based, via that one of said first loop or said second loop to which this existing storage device is connected.

3. A storage system according to claim 2, wherein said controller:

(3-1) if the result of said first suitability decision is negative, receives selection as to whether or not to continue processing for additional provision from the user, and, if continuation of processing for additional provision has been selected, when detachment of the additional storage device which had acquired the address for which the negative suitability decision result was obtained and attachment of an additional storage device for a second time have been performed by the user, performs said (1-2) a second time for this additional storage device;

(3-2) if the result of said second suitability decision is negative, receives selection as to whether or not to continue processing for additional provision from the user, and, if continuation of processing for additional provision has been selected, when detachment of the additional storage device which had acquired the address for which the negative suitability decision result was obtained and attachment of an additional storage device for a second time have been performed by the user, performs said (2-2) a second time for this additional storage device.

4. A storage system according to claim 3, wherein said controller:

in said first suitability decision decides:

whether or not the address which was acquired in said (1-3) is an address which agrees with the position at which said additional storage device is attached; and whether or not the address which was acquired in said (1-3) duplicates the address of some existing storage device or an address for which said first suitability decision is affirmative;

and, in said second suitability decision, decides:

whether or not the address which was acquired in said (2-3) is an address which agrees with the position at which said additional storage device is attached; and whether or not the address which was acquired in said (2-3) duplicates the address of some existing storage device or an address for which said first suitability decision is affirmative.

5. A storage system according to claim 4, wherein said controller first executes said (1-2) and said (2-2) for that additional storage device which is most to the side of the controller.

6. A storage system according to claim 5, wherein said controller comprises a first adapter which is connected to said first switching device and a second adapter which is connected to said second switching device, and wherein said first adapter performs said first diagnostics processing and said second adapter performs said second diagnostics processing.

7. A storage system according to claim 6, wherein:
said controller has a memory shared between said first adapter and said second adapter;
said shared memory stores:
first information which specifies which storage devices are existing storage devices;
second information which specifies which storage devices are additional storage devices;
third information which specifies to which of said first loop and said second loop said existing storage devices are connected; and
fourth information which specifies, for each additional storage device, the results of said first suitability decision and said second suitability decision;
and said first adapter and said second adapter:
(4-1) when an additional storage device has been attached, updates said fourth information for this additional storage device which has been attached so that the results of both said first suitability decision and said second suitability decision are negative;
(4-2) for an additional storage device for which the result of said first suitability decision or said second suitability decision is affirmative, updates the result of said first suitability decision or said second suitability decision in said fourth information from negative to affirmative;
(4-3) decides whether an additional storage device for which, in said fourth information, the result of said first suitability decision or said second suitability decision is negative, is which is not yet connected or is an additional storage device for which said diagnostics have not yet been performed;
(4-4) If all of the existing storage devices are connected to said first loop or said second loop, or if all of the existing storage devices have been disconnected from said first loop or said second loop, updates said third information, and decides, on the basis of said third information, via which of said first loop and said second loop said I/O is to be performed for the existing storage devices; and
(4-5) in order to complete processing for additional provision, writes information relating to all of said additional storage devices in said first information, and deletes information related to all of said additional storage devices from said second information.

8. A storage system according to claim 1, wherein:
all of said existing storage devices are initially connected both to said first loop and also to said second loop;
all of said additional storage devices are initially disconnected both from said first loop and also from said second loop; and
said controller, before connecting any one of said additional storage devices to either one of said first loop or said second loop, disconnects all of said existing storage devices from said either one of said first loop and said second loop.

9. A storage system according to claim 8, wherein, if an I/O command has been received from an external device during said processing for additional provision, in response to this I/O command, said controller performs I/O to the existing storage device upon which the logical storage device designated by this I/O command is based, via that one of said first loop or said second loop to which this existing storage device is connected.

10. A storage system according to claim 1, wherein, if the result of said first suitability decision is negative, said controller, when detachment of the additional storage device which had acquired the address for which the negative suitability decision result was obtained and attachment of an additional storage device for a second time have been performed by the user, performs said (1-2) a second time for this additional storage device which has been attached for a second time.

11. A storage system according to claim 1, wherein, if the result of said second suitability decision is negative, said controller, when detachment of the additional storage device which had acquired the address for which the negative suitability decision result was obtained and attachment of an additional storage device for a second time have been performed by the user, performs said (2-2) a second time for this additional storage device which has been attached for a second time.

* * * * *